US008417994B2

(12) United States Patent
Roshen et al.

(10) Patent No.: US 8,417,994 B2
(45) Date of Patent: Apr. 9, 2013

(54) SEVERITY MAP OF CHANGE-INDUCED PERVASIVE SERVICES OUTAGES (75) Inventors: Waseem A. Roshen, Hilliard, OH (US); Mark L. Allsop, Wahroonga (AU); Robert A. G. Daniel, Southampton (GB); Nadeem Malik, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 12/795,287

(22) Filed: Jun. 7, 2010

(65) Prior Publication Data
US 2011/0302462 A1    Dec. 8, 2011

(51) Int. Cl.
*G06F 11/00* (2006.01)
(52) U.S. Cl. ............ 714/25; 714/26; 714/38.14; 714/57
(58) Field of Classification Search ............ 714/25, 714/26, 37, 38.14, 46, 57
See application file for complete search history.

(56) References Cited

U.S. PATENT DOCUMENTS

| 7,516,438 | B1 | 4/2009 | Leonard et al. | |
| 7,788,536 | B1* | 8/2010 | Qureshi et al. | 714/38.14 |
| 2004/0201867 | A1 | 10/2004 | Katano | |
| 2005/0015678 | A1* | 1/2005 | Miller | 714/38 |
| 2006/0149506 | A1 | 7/2006 | Cutuli et al. | |
| 2007/0005852 | A1 | 1/2007 | Armstead et al. | |
| 2007/0192236 | A1* | 8/2007 | Futch et al. | 705/38 |
| 2008/0034060 | A1* | 2/2008 | Fisher | 709/218 |
| 2008/0229199 | A1 | 9/2008 | Richardson et al. | |
| 2009/0276728 | A1 | 11/2009 | Doan et al. | |

FOREIGN PATENT DOCUMENTS

JP    2009205502 A    9/2009

OTHER PUBLICATIONS

IBM, "Problem Signature Capture for Automatic Problem Detection", pp. 1-2, Mar. 13, 2006, IP.Com No. IPCOM000134612D.

* cited by examiner

*Primary Examiner* — Joseph D Monoskey
(74) *Attorney, Agent, or Firm* — John R. Pivnichny; Law Office of Jim Boice (57) ABSTRACT A computer implemented method, system and/or computer program product handle problems caused by a modification to an information technology (IT) system. Problem-data, describing a known problem to a first IT system that occurred during a modification to the first IT system; severity-data, describing a severity of the known problem; and solution-data, describing a solution of steps to be taken to correct the known problem, are received and stored. A modification alert indicates that the modification will be applied to a second IT system that is different from the first IT system. If the first IT system and the second IT system share a pre-determined amount of common features, then a severity map, which describes the known problem, the severity of the known problem, and the solution to the known problem as applied to the second IT system, is displayed to a user of the second IT system.

20 Claims, 5 Drawing Sheets

304a — KEY WORD/PHRASE NO. 1
304b — KEY WORD/PHRASE NO. 2
304c — KEY WORD/PHRASE NO. 3
304d — KEY WORD/PHRASE NO. 4

PLEASE ENTER KEY WORDS OR PHRASES RELATED TO THE CHANGE BEING ANTICIPATED

SEVERITY MAP OF CHANGE-INDUCED PERVASIVE SERVICES OUTAGES

BACKGROUND

The present disclosure relates to the field of computers, and specifically to the modification of computers and computer systems. Still more particularly, the present disclosure relates to monitoring computer systems for potential outages caused by system modifications.

BRIEF SUMMARY

A computer implemented method, system and/or computer program product handle problems caused by a modification to an information technology (IT) system. Problem-data, describing a known problem to a first IT system that occurred during a modification to the first IT system; severity-data, describing a severity of the known problem; and solution-data, describing a solution of steps to be taken to correct the known problem, are received and stored. A modification alert indicates that the modification will be applied to a second IT system that is different from the first IT system. If the first IT system and the second IT system share a pre-determined amount of common features, then a severity map, which describes the known problem, the severity of the known problem, and the solution to the known problem as applied to the second IT system, is displayed to a user of the second IT system.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
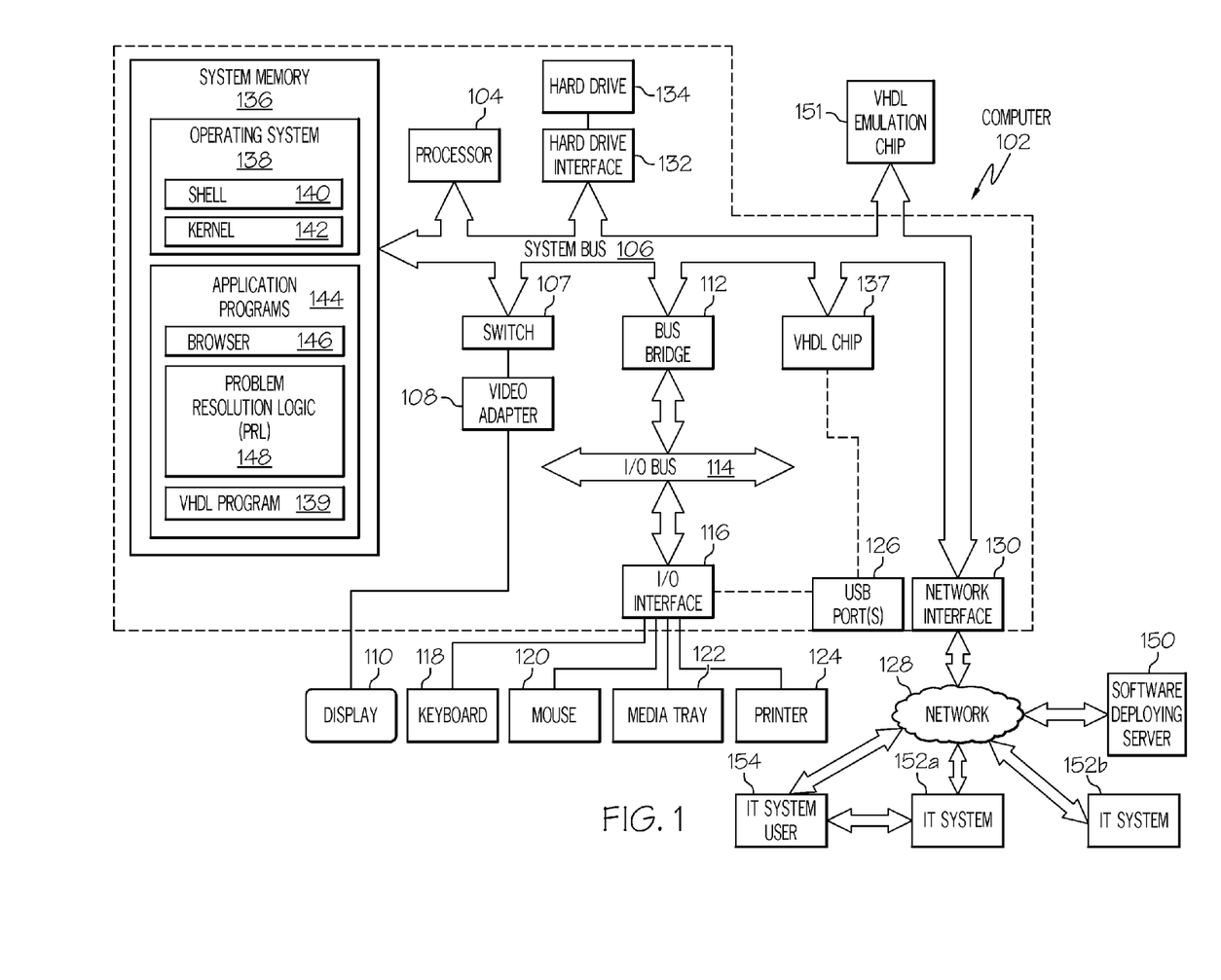
FIG. 1 depicts an exemplary computer in which the present disclosure may be implemented.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150, information technology (IT) systems 152a-b, and/or IT system user 154. Note that IT system 152a and IT system 152b may be standalone computers, servers, or they may be networked and distributed computing systems.

Computer 102 includes a processor 104 that is coupled to a system bus 106. Processor 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, which may be mechanical, that allows the display 110 to be coupled to the system bus 106, and thus to be functional only upon execution of instructions (e.g., problem resolution logic—PRL 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a problem resolution logic (PRL) 148. PRL 148 includes code for implementing the processes described below, including those described in FIGS. 2-5. In one embodiment, computer 102 is able to download PRL 148 from software deploying server 150, including in an on-demand basis, wherein the code in PRL 148 is not downloaded until needed for execution to define and/or implement the improved enterprise architecture described herein. Note further that, in one embodiment of the present invention, software deploying server 150 performs all of the functions associated with the present invention (including execution of PRL 148), thus freeing computer 102 from having to use its own internal computing resources to execute PRL 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from PRL 148 causes VHDL program 139 to configure VHDL chip 137, which may be an FPGA, ASIC, etc.

In another embodiment of the present invention, execution of instructions from PRL 148 results in a utilization of VHDL program 139 to program a VHDL emulation chip 151. VHDL emulation chip 151 may incorporate a similar architecture as described above for VHDL chip 137. Once PRL 148 and VHDL program 139 program VHDL emulation chip 151, VHDL emulation chip 151 performs, as hardware, some or all functions described by one or more executions of some or all of the instructions found in PRL 148. That is, the VHDL emulation chip 151 is a hardware emulation of some or all of the software instructions found in PRL 148. In one embodiment, VHDL emulation chip 151 is a programmable read only memory (PROM) that, once burned in accordance with instructions from PRL 148 and VHDL program 139, is permanently transformed into a new circuitry that performs the functions needed to perform the process described below in FIGS. 2-5.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
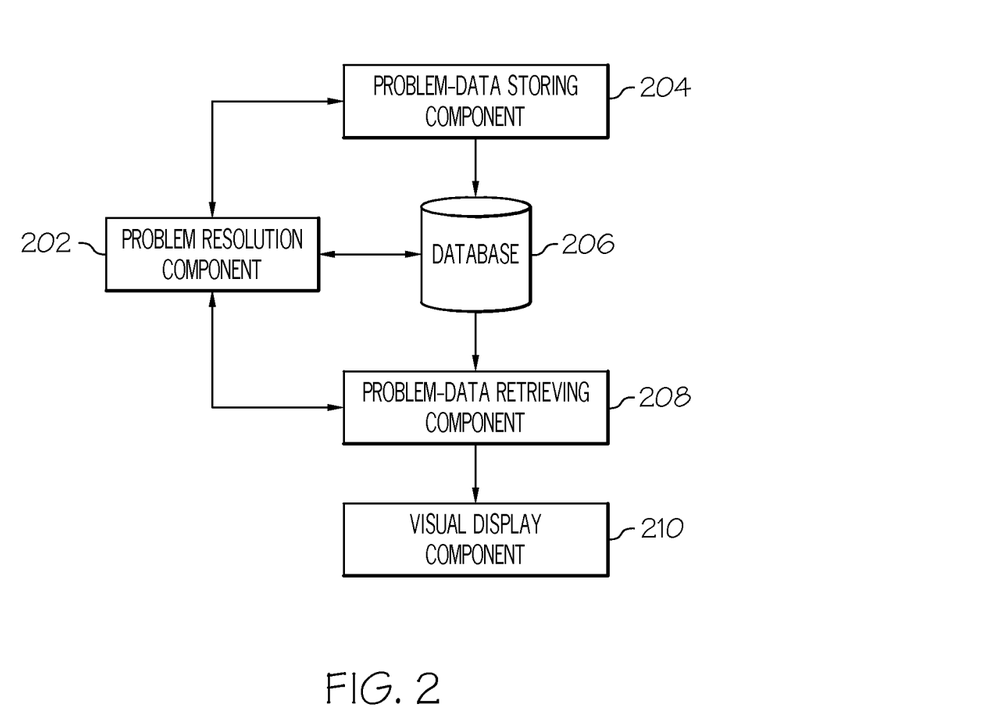
FIG. 2 illustrates relationships in a problem management component used to handle problems in information technology (IT) systems.

Referring now to FIG. 2, a problem resolution component 202, which may be part or all of computer 102 shown in FIG. 1, is coupled to a problem-data storing component 204, a database 206, and a problem-data retrieving component 208. In one embodiment, problem-data storing component 204 and problem-data retrieving component 208 are part of PRL 148 shown in FIG. 1. Similarly, database 206 may be stored in hard drive 134 or other storage devices depicted in FIG. 1. As described in detail herein, problem-data storing component 204 contains information about known problems associated with a first computer system, such as IT system 152*a* shown in FIG. 1. This information comprises a name and description of a problem that occurred when a modification was made, or was attempted, to the first computer system, as well as the severity of the problem and any known solutions to the problem. When the same or similar modification is made to a second computer system, with the likelihood of the same problem arising, the problem-data retrieving component 208 retrieves the information about the problem and displays it in a severity map that is displayed using a visual display component 210, which includes hardware and software for displaying the severity map on a user interface, a printer, a webpage, a graphics file that is transmitted to a remote location, etc. In one embodiment, the first and second computer systems (i.e., IT systems) are different systems.

Figure 3:
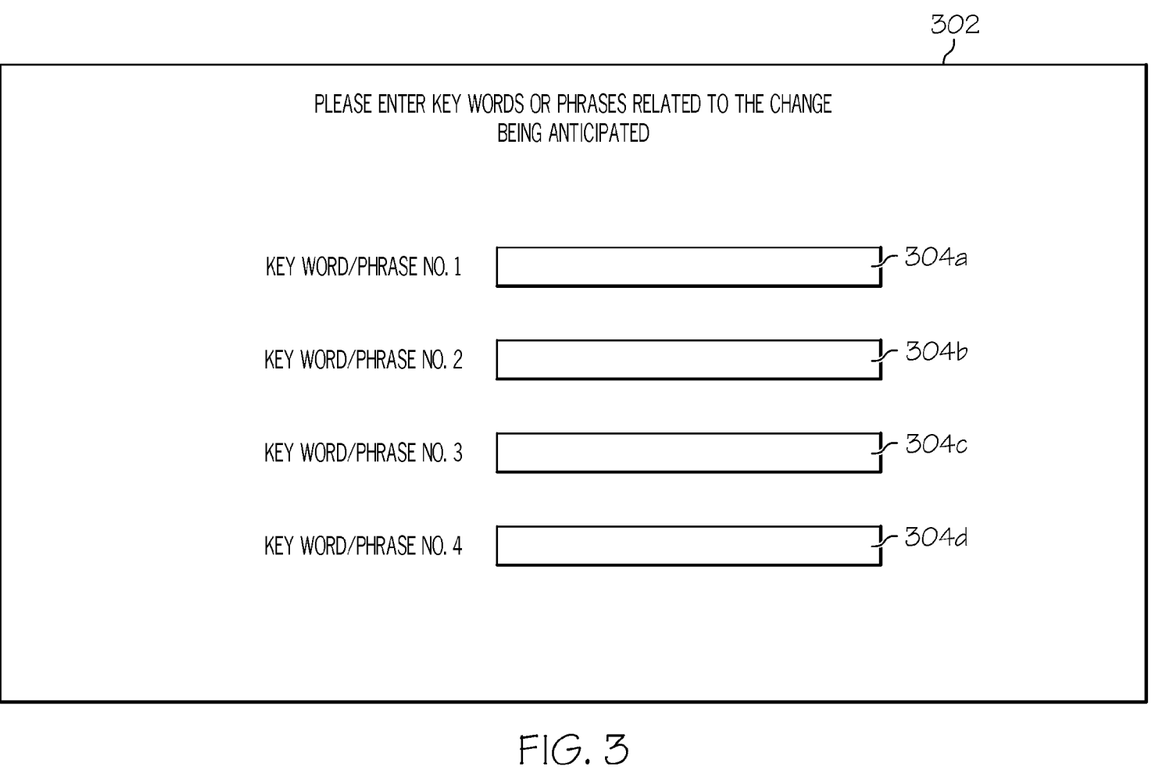
FIG. 3 depicts an exemplary user interface (UI) used to describe an anticipated change to an IT system.

With reference now to FIG. 3, assume that a user or IT manager of a second IT system is planning on making a modification to the second IT system. By utilizing the input boxes 304*a-d* on the user interface 302, key words or phrases describing the modification can be input into the problem resolution component 202, resulting in the generation of the severity map.

Figure 4:
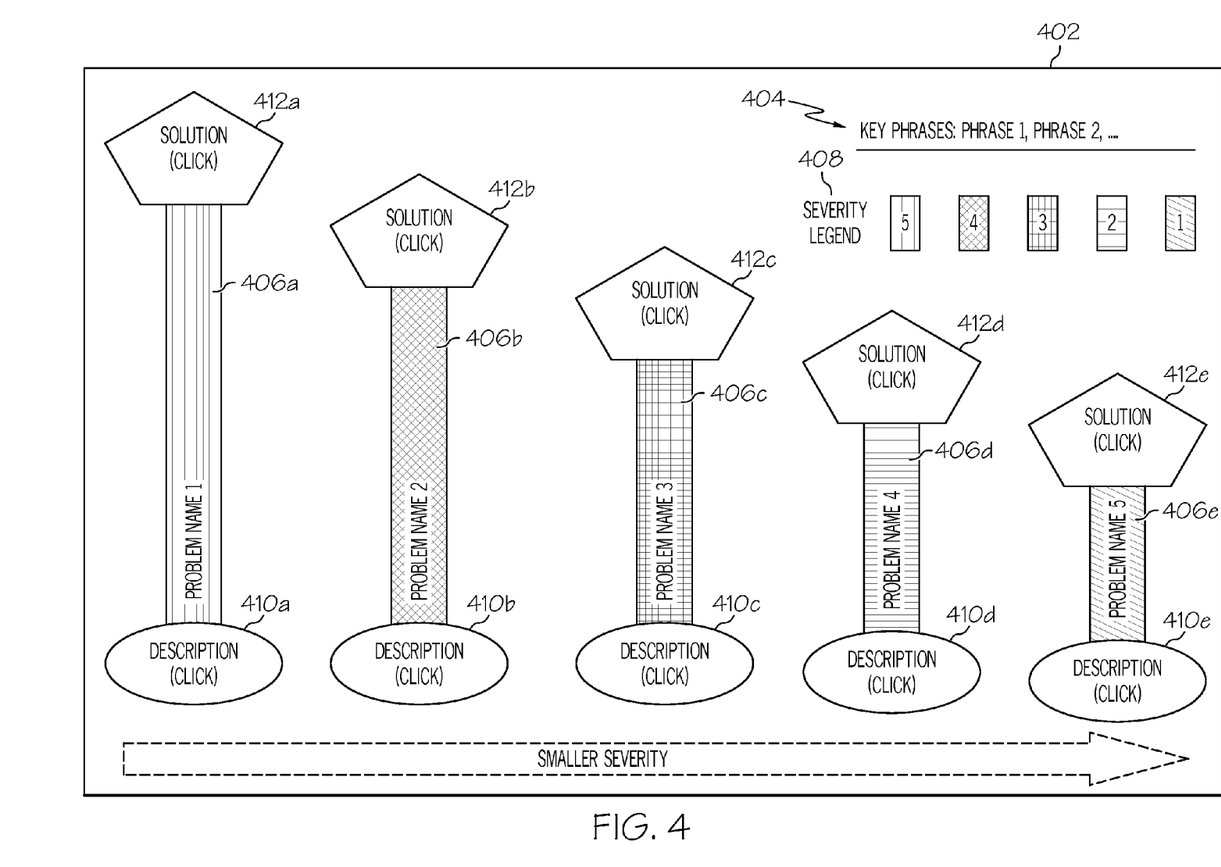
FIG. 4 illustrates an exemplary severity map describing multiple problems associated with the anticipated change to the IT system.

With reference now to FIG. 4, assume that a user/manager of the second IT system has input "new server" in input box 304*a* and "new operating system" in input box 304*b* of user interface 302. This combination of modifications resulted in five problems 406*a-e* when made to a first IT system. However, if the first and second IT systems are deemed to be similar, then an assumption is made that the same five problems 406*a-e* will likewise occur on the second IT system. Besides showing the names of the five problems 406*a-e* on the user interface 402, the key phrases 404 that were entered into the input boxes 304*a-b* in FIG. 3 are also shown, thus giving the user a quick reference as to what events/modifications are likely to trigger the problems 406*a-e*.

The severity (i.e., how much damage or outage of services to the IT system will be caused by the modifications) of each of the problems 406*a-e* is color coded by a severity legend 408 as well as the height of the bar depicting each of the problems 406*a-e*. In order to know more about the problems 406*a-e*, each of the problems 406*a-e* has an associated description tab 410*a-e*. By clicking or hovering over a particular description tab, a detailed explanation is presented describing the problem in detail, either in a pop-up window or on another user interface. Similarly, clicking or hovering over a respective solution tab 412*a-e* results in a display, either in a pop-up window or on another user interface, of what series of steps need to be taken to cure the associated problem.

Note that the detailed descriptions related to the description tabs 410*a-e* and detailed instructions associated with the solution tab 412*a-e* have been previously entered by a user of the first IT system. For example, the description associated with description tab 410*a* could be "Description: This is test description for problem named 'Name 1'. This is a serious problem and must be corrected before further changes are made. Make sure it is corrected and correction implemented. Otherwise serious interruption of the IT system and services will occur and you will be held responsible."

Associated with description tab 410*a* is solution tab 412*a*. Clicking on solution tab 412*a*, results in the presentation of a detailed solution (in another window, in another page, on a pop-up, etc.). For example, the solution to problem 406*a* might be "Solution: This is test solution for problem named 'Name 1'. This is a serious problem and must be corrected before further changes are made. Follow the following steps to correct the problem: This is step one; This is step two; This is step three."

Thus, the user/manager of the second IT system is able to utilize the knowledge of the user/manager of the first IT system, such that substantially similar problems have known reusable solutions.

Figure 5:
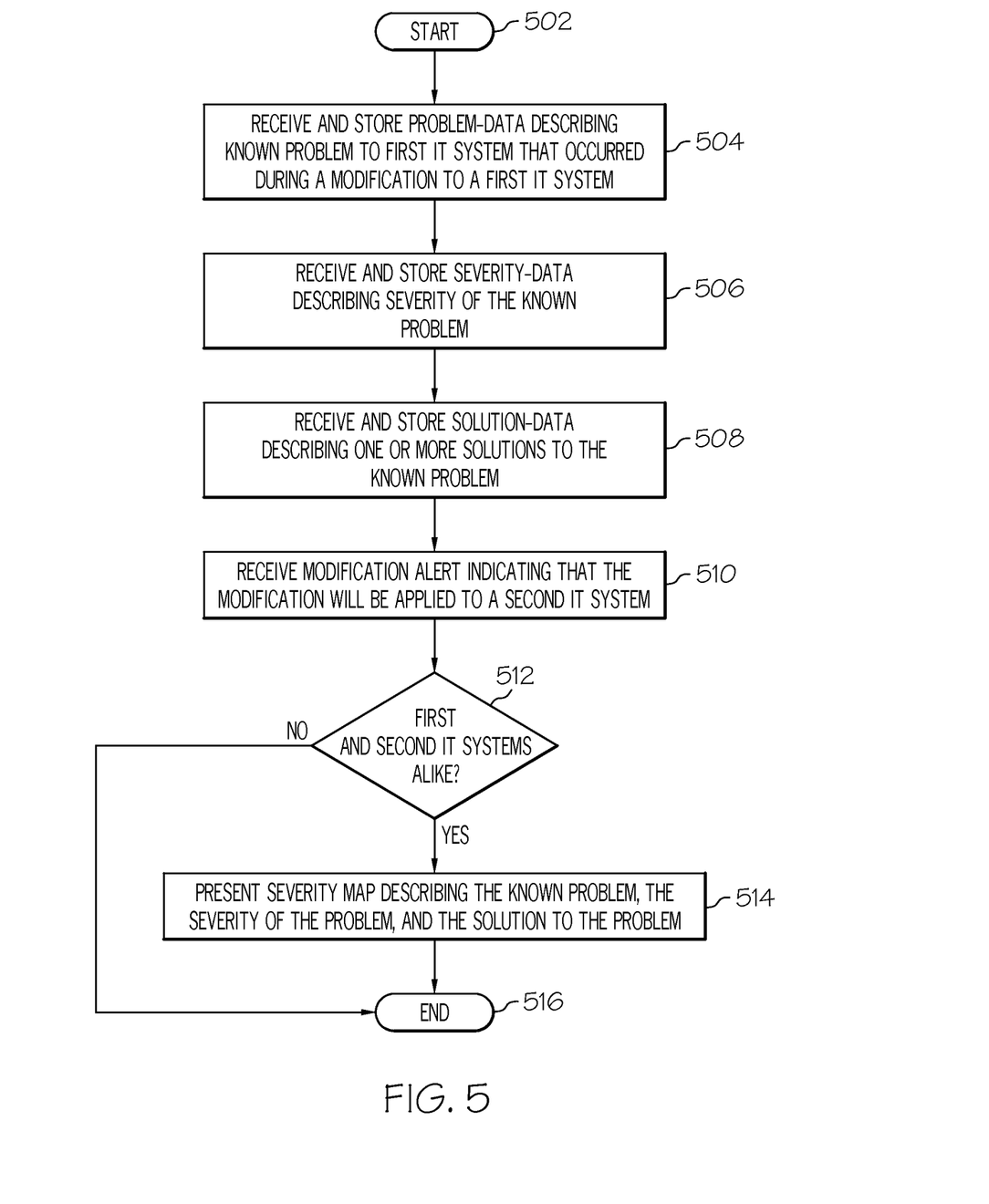
FIG. 5 is a high level flow chart of one or more exemplary steps taken by a processor to handle problems in an IT system.

With reference now to FIG. 5, a high level flow chart of one or more exemplary steps taken by a processor to handle problems in an information technology (IT) system are presented. After initiator block 502, problem-data is received and stored (block 504). The problem-data describes a known problem to a first IT system that occurred during a modification to the first IT system. Examples of such modifications include, but are not limited to, a modification of existing software (including applications and operating systems) in the IT system; an addition of a new user of the IT system; an installation of new hardware to the IT system; a modification of existing hardware in the IT system; and a change to security protection (including firewalls, password systems, etc.) for the IT system.

As described in block 506, severity-data is received and stored. The severity-data describes a severity of the known problem, particularly when the known problem occurred in the first IT system. As described in block 508, solution-data is received and stored. The solution-data describes a solution of steps that need to be taken in order to correct the known problem.

With reference now to block 510, a modification alert is received. The modification alert indicates that the modification will be applied to a second IT system that is different from the first IT system. There are several ways that this modification alert can be generated. In one embodiment, the modification alert results from a user manually inputting key words into boxes such as input boxes 304*a-e* shown in FIG. 3. In another embodiment, the modification alert results from a monitored electronic communication message from a user of the second IT system. For example, assume that a user of the second IT system sends an e-mail or an instant message to an IT manager, stating that he is planning on adding a new program or piece or hardware to his computer, which is part of the second IT system. A problem resolution component, such as problem resolution component 202 shown in FIG. 2, will utilize key word recognition and/or text interpretation logic to recognize the user's intent. This will result (see block 514) in a severity map being presented to the user and/or the IT manager. In another embodiment, the modification alert can come from a system monitoring logic for the second IT system. Such monitoring systems, which can include dashboards, will notify the user and/or IT manager of a change that has occurred to the second IT system. In another embodiment, the problem resolution component 202 will monitor any orders placed by the IT manager and/or user of the second IT system for new hardware or software. This results in a conclusion that this new hardware/software is destined for installation in the second IT system, thus resulting in the modification alert. In another embodiment, the problem resolution component 202 monitors a browser that is used by the IT manager of the second IT system to identify access to a help website related to the modification by the IT manager. If the IT manager has accessed a help website dealing with the modification that has caused a problem in the first IT system, then an assumption is made that the IT manager is contemplating such a modification, and creation/display of the severity map is triggered.

With reference now to query block 512, a query is made as to whether the first and second IT systems are significantly similar to assume that a problem-causing modification to the first IT system will cause the same problem to the second IT system. This "significant similarity" is a predefined amount of common features held by the first and second IT systems. That is, the first and second IT systems may share resources, or they may use the same type/brand/model/release of a resource, although that second resource is a different iteration from the first resource. Examples of common features are hardware, software, input/output interfaces, and any combination thereof.

As described in block 514, if the first and second IT systems are deemed to have the predetermined level of similar components, then the creation and display of a severity map such as that shown in FIG. 4 is performed. This severity map describes the known problem, the severity of the known problem, and the solution to the known problem as applied to the second IT system. The process ends at terminator block 516.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method of handling problems in an information technology (IT) system, the computer implemented method comprising:
   a processor receiving and storing problem-data, wherein the problem-data describes a known problem in a first IT system that occurred during a modification to the first IT system;
   the processor receiving and storing severity-data, wherein the severity-data describes a severity of the known problem;
   the processor receiving and storing solution-data, wherein the solution-data describes a solution of steps to be taken to correct the known problem;
   the processor receiving a modification alert, wherein the modification alert indicates that the modification will be applied to a second IT system that is different from the first IT system;
   the processor determining if the first IT system and the second IT system share a pre-determined amount of common features; and
   in response to the processor determining that the first IT system and the second IT system share the pre-determined amount of common features, enabling a display of a severity map, wherein the severity map describes the known problem, the severity of the known problem, and the solution to the known problem as applied to the second IT system.

2. The computer implemented method of claim 1, further comprising:
   receiving an input from a user of the second IT system to indicate that the modification will be applied to the second IT system, wherein the input from the user is via user inputs to input boxes on a user interface.

3. The computer implemented method of claim 1, further comprising:
   monitoring an electronic communication message from a user of the second IT system to identify an intent of the user to apply the modification to the second IT system.

4. The computer implemented method of claim 3, further comprising:
   presenting the severity map to the user.

5. The computer implemented method of claim 3, further comprising:
   presenting the severity map to a recipient of the electronic communication message.

6. The computer implemented method of claim 1, further comprising:
   monitoring a system monitoring logic for the second IT system to detect and identify the modification being applied to the second IT system.

7. The computer implemented method of claim 6, wherein the system monitoring logic is a dashboard of events for the second IT system.

8. The computer implemented method of claim 1, further comprising:
   monitoring an order for computer resources placed by an IT manager of the second IT system to identify an intent of the IT manager to apply the modification to the second IT system.

9. The computer implemented method of claim 1, further comprising:
   monitoring a browser used by an IT manager of the second IT system to identify access to a help website related to the modification by the IT manager; and
   in response to detecting that the IT manager has accessed the help website related to the modification, triggering said display of the severity map.

10. The computer implemented method of claim 1, wherein the modification is an installation of new software to the second IT system.

11. The computer implemented method of claim 1, wherein the modification is a modification of existing software in the second IT system.

12. The computer implemented method of claim 1, wherein the modification is an addition of a new user of the second IT system.

13. The computer implemented method of claim 1, wherein the modification is an installation of new hardware to the second IT system.

14. The computer implemented method of claim 1, wherein the modification is a reconfiguration of existing hardware in the second IT system.

15. The computer implemented method of claim 1, wherein the modification is a change to security protection for the second IT system.

16. The computer implemented method of claim 1, wherein the common features are common types of hardware.

17. The computer implemented method of claim 1, wherein the common features are common types of software.

18. The computer implemented method of claim 1, wherein the common features are common types of input/output interfaces.

19. A computer program product for handling problems in an information technology (IT) system, the computer program product comprising:
   a computer readable storage media;
   first program instructions to receive and store problem-data, wherein the problem-data describes a known problem in a first IT system that occurred during a modification to the first IT system;
   second program instructions to receive and store severity-data, wherein the severity-data describes a severity of the known problem;
   third program instructions to receive and store solution-data, wherein the solution-data describes a solution of steps to be taken to correct the known problem;
   fourth program instructions to receive a modification alert, wherein the modification alert indicates that the modification will be applied to a second IT system that is different from the first IT system;
   fifth program instructions to determine if the first IT system and the second IT system share a pre-determined amount of common features; and
   sixth program instructions to, in response to determining that the first IT system and the second IT system share the pre-determined amount of common features, enable a display of a severity map, wherein the severity map describes the known problem, the severity of the known problem, and the solution to the known problem as applied to the second IT system; and wherein
   the first, second, third, fourth, fifth and sixth program instructions are stored on the computer readable storage media.

20. A computer system comprising:
   a central processing unit (CPU), a computer readable memory, and a computer readable storage media;
   first program instructions to receive and store problem-data, wherein the problem-data describes a known problem in a first IT system that occurred during a modification to the first IT system;
   second program instructions to receive and store severity-data, wherein the severity-data describes a severity of the known problem;
   third program instructions to receive and store solution-data, wherein the solution-data describes a solution of steps to be taken to correct the known problem;
   fourth program instructions to receive a modification alert, wherein the modification alert indicates that the modification will be applied to a second IT system that is different from the first IT system;
   fifth program instructions to determine if the first IT system and the second IT system share a pre-determined amount of common features; and
   sixth program instructions to, in response to determining that the first IT system and the second IT system share the pre-determined amount of common features, enable a display of a severity map, wherein the severity map describes the known problem, the severity of the known problem, and the solution to the known problem as applied to the second IT system; and wherein
   the first, second, third, fourth, fifth and sixth program instructions are stored on the computer readable storage media for execution by the CPU via the computer readable memory.

* * * * *